No. 787,133. PATENTED APR. 11, 1905.
A. THORSBY.
CHUCK FOR SPINDLE TURNING MACHINES.
APPLICATION FILED MAY 21, 1904.

Witnesses:
Inventor:
Axel Thorsby
By C. J. Hawley
his atty.

No. 787,133. PATENTED APR. 11, 1905.
A. THORSBY.
CHUCK FOR SPINDLE TURNING MACHINES.
APPLICATION FILED MAY 21, 1904.

Witnesses:
Louis M. Whitehead
John R. Leforte

Inventor:
Axel Thorsby
By W. Hawley
his atty.

No. 787,133. PATENTED APR. 11, 1905.
A. THORSBY.
CHUCK FOR SPINDLE TURNING MACHINES.
APPLICATION FILED MAY 21, 1904.

Witnesses:

Inventor:
Axel Thorsby

No. 787,133. PATENTED APR. 11, 1905.
A. THORSBY.
CHUCK FOR SPINDLE TURNING MACHINES.
APPLICATION FILED MAY 21, 1904.

No. 787,133. PATENTED APR. 11, 1905.
A. THORSBY.
CHUCK FOR SPINDLE TURNING MACHINES.
APPLICATION FILED MAY 21, 1904.
6 SHEETS—SHEET 6.

No. 787,133. Patented April 11, 1905.

UNITED STATES PATENT OFFICE.

AXEL THORSBY, OF BELOIT, WISCONSIN, ASSIGNOR TO C. MATTISON MACHINE WORKS, OF BELOIT, WISCONSIN, A CORPORATION OF WISCONSIN.

CHUCK FOR SPINDLE-TURNING MACHINES.

SPECIFICATION forming part of Letters Patent No. 787,133, dated April 11, 1905.

Application filed May 21, 1904. Serial No. 209,124.

*To all whom it may concern:*

Be it known that I, AXEL THORSBY, a citizen of the United States, residing in the city of Beloit, in the county of Rock and State of Wisconsin, have invented a certain new, useful, and Improved Chuck for Spindle-Turning Machines, of which the following is a specification.

My invention relates to machines for turning spindles, columns, &c., and has special reference to the work-holders thereof.

My invention further and particularly relates to work-holders or chucks for use upon the column and baluster turning machine that is shown and described in the application of Christen Mattison, filed November 9, 1903, Serial No. 190,434.

The object of my invention is to improve the construction and arrangement of the revoluble chucks belonging to such machines and to provide means whereby the work may be secured in or released from said chucks more easily and quickly than with any of the constructions in use at the present time.

Another and particular object of the invention is to provide the work-carrier of a spindle or baluster turning machine with chucks that shall be independently operable, but which shall also be simultaneously and automatically operable to grasp or free the work to the end that said chucks may by their automatic action lend increased capacity to the machine.

My invention consists generally in the combination of the work carrier or frame of a turning lathe or machine with chucks which are revolubly mounted on said carrier, means for rotating said chucks, and automatic devices for securing and freeing the work therein when said chucks are rotated; and, further, my invention consists in an automatic chuck of the class described comprising two revoluble members, in combination with means for positively rotating one of said members, means for retarding the rotation of the other member, and work-gripping devices actuated by the rotative movement of said members; and, further and particularly, my invention consists in a work-carrier of the class described having chuck-stocks, in combination with revoluble chucks in said stocks, each thereof comprising relatively revoluble members, rotating means upon said carrier connecting corresponding members of said chuck, other means upon said carrier for retarding the rotation of the second member of each chuck during a portion of the rotary movement of the companion members, work-gripping devices in said chuck, and means whereby said gripping devices are operated when the connected members of the chucks are rotated; and, further, my invention consists in various details of construction and in combinations of parts, all as hereinafter described, and particularly pointed out in the claims.

My invention will be more readily understood by reference to the accompanying drawings, forming a part of this specification, and in which—

Fig. 13 is an end view thereof. Fig.

14 is an enlarged detail showing the manner of securing the ends of the retarding-chuck or brake-band.

My invention is capable of employment in and upon various machines. Nevertheless it is particularly intended for and adapted to all kinds of spindle baluster and column turning machines, and I have therefore illustrated and shall describe my invention in connection with such a machine and as being part thereof.

Figure 1:
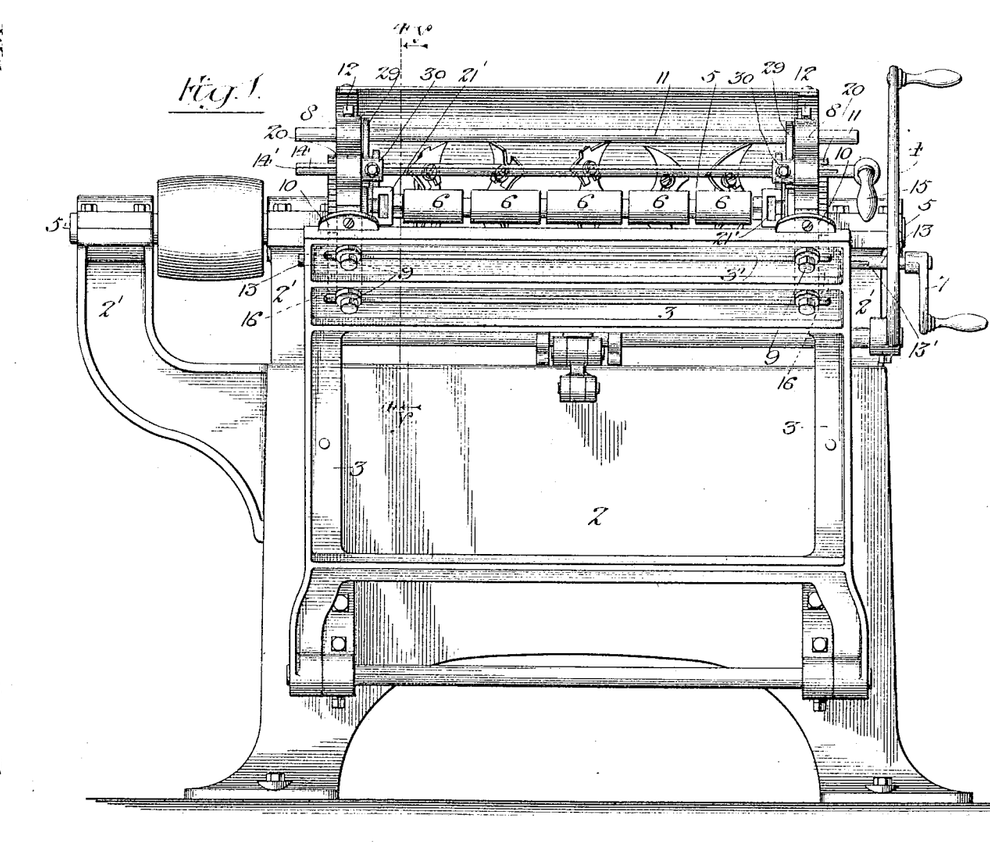
Figure 1 is a side elevation of a spindle-turning machine embodying my invention.
Figure 2:
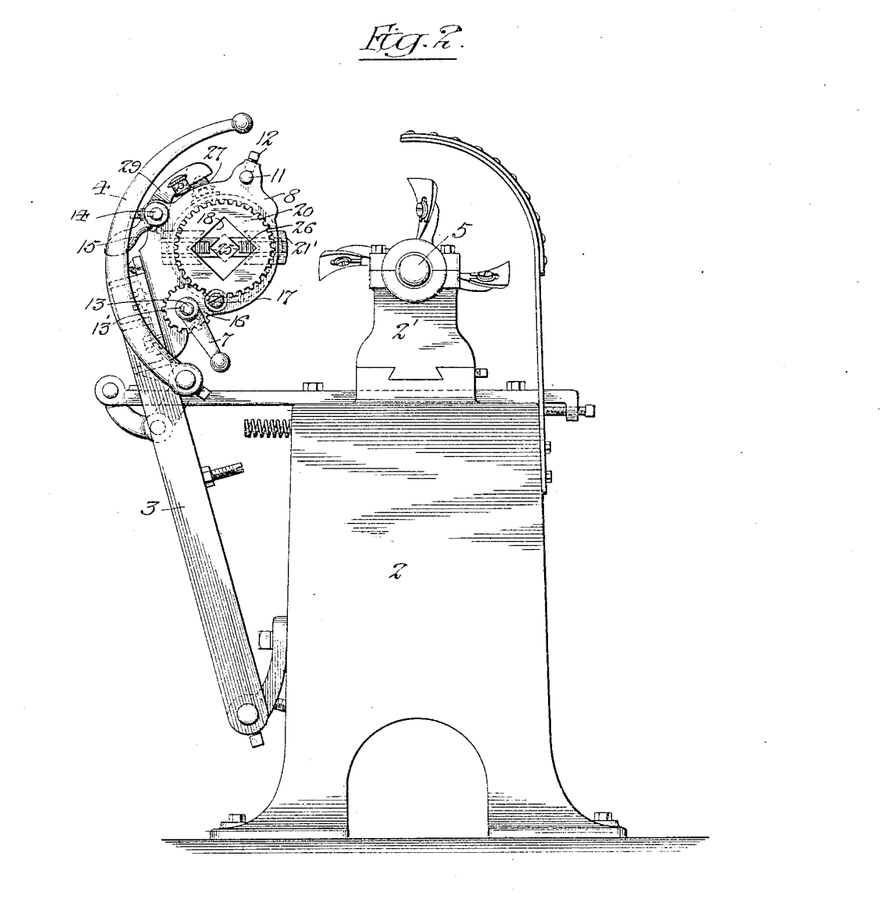
Fig. 2 is an end elevation thereof.
Figure 3:
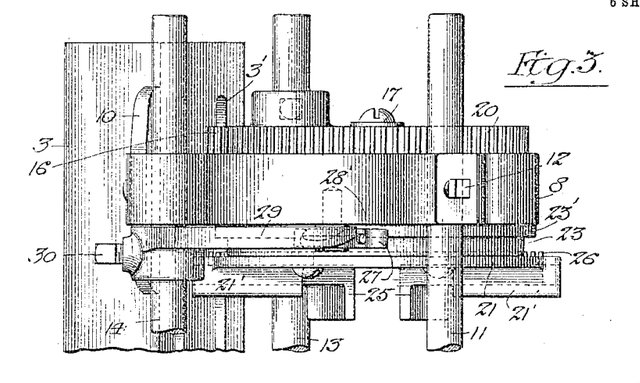
Fig. 3 is an enlarged plan view of one of the chuck-stocks of the machine containing a novel chuck and operating mechanism embodying my invention.
Figure 4:
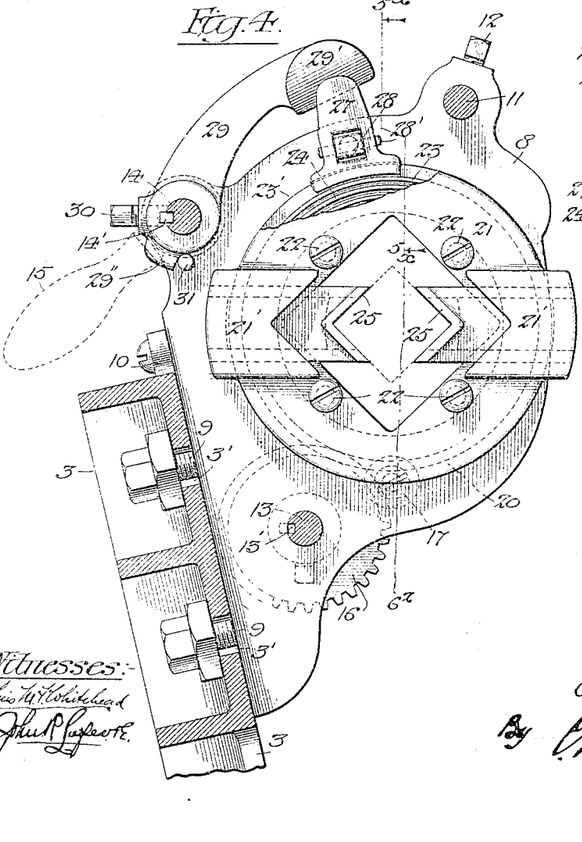
Fig. 4 is an enlarged transverse vertical section through the upper part of the work-carriage on line $4^y 4^y$ of Fig. 1, being an end view taken from Fig. 3.
Figure 5:
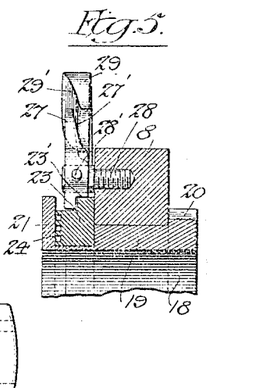
Fig. 5 is a sectional detail on the line $5^x 5^x$ of Fig. 4.
Figure 6:
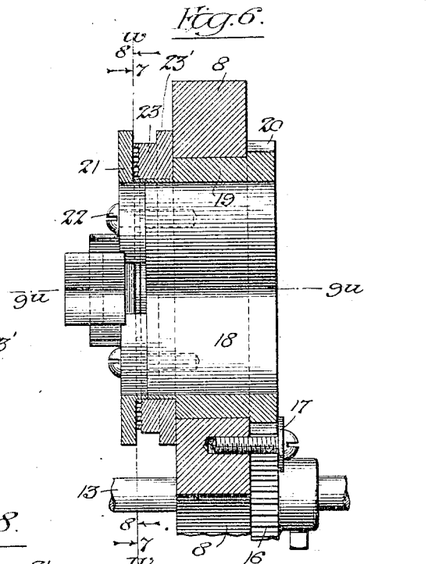
Fig. 6 is a vertical longitudinal section of the chuck-stock and chuck on the line $5^x 6^z$ of Fig. 4, the retarding device being omitted.
Figure 7:
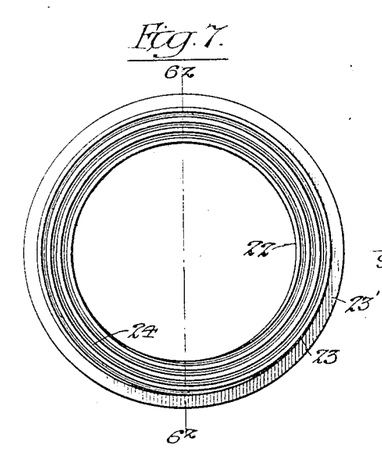
Fig. 7 is a detail view on the line W W of Fig. 6 viewed in the direction of the arrows 7 7.
Figure 8:
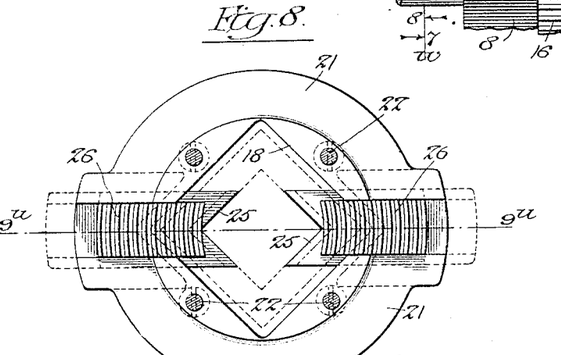
Fig. 8 is another view on the line W W of Fig. 6 viewed in the direction of the arrows 8 8.
Figure 9:
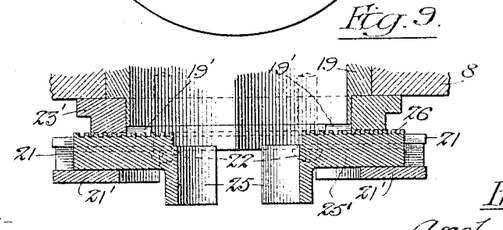
Fig. 9 is a horizontal section on the lines $9^u 9^u$ of Figs. 6 and 8.

The drawings show a spindle column or baluster turning machine of a type which is now well known. The principal parts of the machine are the high base 2, the swinging carriage 3, having its lower end pivoted on the base, the carriage-swinging mechanism comprising the link device shown and the operating-crank 4, the work-holding devices on the upper part of said carriage, and the cutter-head arbor 5, carrying the cutter-heads 6 and held in bearings 2' on the top of the base 2. The stick of wood or "work" is usually square in cross-section and is first placed or fastened in the work-holding chucks. Then the carriage is swung toward the base and against a suitable stop by means of the crank 4. In this manner the work is moved into the path of the rapidly-rotating cutters 6. Here, as in other machines of the class, the work is rotated by hand to expose the complete circumference thereof to the action of the cutters. The rotation of the work is accomplished by a small hand-crank 7, which moves with the carriage and on being turned rotates the chucks that hold the work. It has been customary heretofore to arrange the two chucks of the machine for rotation by a hand-crank like this one, and to that extent their relative movement has been automatic; but in every other sense the chucks have always been hand-operated devices requiring separate or individual manipulation—that is, to grasp or to release a piece of work it has been necessary to operate each chuck by hand—thus necessitating delay in the operation of the work-turning crank. The principal object of my invention is to avoid this limitation upon the capacity of the machine and to provide a work-holding mechanism wherein the chuck-turning crank 7 shall practically perform all the operations of tightening, turning, and loosening the chucks and work to the end that at least one hand motion and much time shall be saved in the operation of the machine. Another object of the invention, which should be clearly understood, is to provide a mechanism of this character wherein by the mere rotation of the hand-crank 7 the chucks shall be caused to automatically grasp and adjust themselves to the piece of work whether the latter be of regular or irregular or tapered form.

Many accidents have resulted from carelessness on the part of the operator in failing to tighten both chucks of his machine and moving an improperly-secured piece of work against the cutters. Opportunity for such carelessness should be obviated, and by making the chucks of my machine entirely automatic I am able to do away with the chief source of danger in and about a spindle-turning machine. The manner in which I attain these objects and results will be clearly understood upon further reference to the drawings. The work-carriage 3 has a plate-like upper part and is provided or equipped with two chuck-stocks 8 8. These are bracket-like devices which occupy vertical planes and are adjustably secured to the carriage by bolts 9, that pass through the longitudinal slots 3' thereof.

10 10 are the alining lugs of the stocks, resting on the finished upper edge of the carriage. The upper parts of the two stocks are joined by a tie-rod 11, secured by set-screws 12. As explained later, the stocks are adjusted on the carriage according to the length of the spindles to be turned and may be so adjusted without affecting the connections between the two chucks that are held in the stocks. These connections comprise a shaft 13 for rotating the chucks and a shaft 14 for operating the retarding devices. Both shafts have bearings in the stocks 8 8 and, like the tie-rod 11, are of sufficient length to allow the adjustment of the stocks to their outermost positions. The hand-crank 7 is attached to the shaft 13, and the retarding-shaft is provided with a handle or grip 15. On the shaft 13 and alongside each stock is a gear-pinion 16. The pinion is held in place against the stock by a screw and washer 17, and the shaft 13 has a keyway 13' to receive internal keys of the pinions 16. In this manner the pinions are made adjustable longitudinally while being adapted for rotation by the shaft. Each stock is provided with a circular opening or bearing for its chuck, which is a device that is adapted to be rotated by the pinion 16. The body of the chuck carries movable jaws for gripping the work, and the novel feature of the chuck comprises the arrangement by which these movable jaws are moved in or out, not by a separate hand operation, but by the rotation of the body of the chuck.

A description of one chuck in detail will serve for both, it being understood that the two chucks occupy right and left or reverse positions, the jaws thereof being presented on the inner sides of the chuck-stocks. The body 19 of the chuck has a large square hole 18 to receive the end of the piece of wood that is to be turned. Said body 19 is externally cylindrical to fit and rotate in the bearing or stock 8. The outer end of the chuck is enlarged to form the gear 20, which meshes with the pinion 16 on shaft 13 for rotating the chuck. The inner end of the chuck-body 19 contains a deep peripheral groove and terminates in a wide flange 21, which is made in the form of a detachable plate secured to the part 19 by screws or bolts 22. In the peripheral groove of the chuck I arrange an independently-revoluble ring 23, which is placed upon the body 19 before the plate 21 is secured by the screws 22. The plate 21 is preferably a casting and is provided with transverse guides or housings 21'. These contain the shanks 25' of the clutch-jaws 25. The jaws proper, 25, have right-angled recesses to receive the work and are moved together or separated to grasp or free the piece of work. I utilize the ring 23 for thus operating the chuck-jaws and as the simplest means of connection provide the end or face of the ring 23 with a spiral thread 24. The jaws have threads 26, that engage the spiral thread on the ring 23, and when the ring 23 is rotated or when the ring 23 is held stationary and the body of the chuck is rotated the jaws, which are carried by said body, will be moved in or out by the action of the spiral thread thereon, according to the direction in which the chuck-body is turned. An advantage of the spiral thread is that the operating-screw thus provided is of such slight pitch that no outward or expanding pressure upon the chuck-jaws will cause the rotation of the ring or the loosening of the jaws. In other words, the device is self-locking in every position. It is obvious that other self-locking operating connections may be devised for use between the relatively movable ring 23 and jaws 25, and for this reason it is not my intention to confine this invention to the mechanism herein shown and described, though I prefer same above all others.

It is entirely feasible to provide means for rotating the rings 23 of the two chucks of the machine either while the chucks are stationary or during their individual rotation; but as such an arrangement would necessitate two hand movements I prefer to so construct my mechanism that the relative movement of chuck and ring will be brought about by the rotation of the body of the chuck in either direction. To accomplish this result, I provide means for stopping or retarding the rotation of the ring 23 when the body of the chuck is rotated or during a portion of the rotation of said body. In short, the necessary movement of the chuck-jaws may be obtained by simply holding the threaded ring stationary until the jaws complete their movement in either direction. The pitch of the spiral thread is so gradual that the jaws when turned with the body of the chuck have but slight tendency to turn the ring. Hence little force is required for holding the ring against rotation at such time. A small clamp or friction lever 27 serves to retard the ring. The lever or clamp 27 is pivotally attached to the stock by a pin 28' in the lug or screw 28. The upper end of the lever is provided with a beveled surface 27', and the lower or short arm of the lever has a broad end or foot adapted to engage the side or shoulder of the flange 23' on ring 23.

29 represents an operating-arm on shaft 14 and having a beveled or wedge face 29' to engage the corresponding face of the clamp 27. When the clamp is operated by the arm 29, the short arm of the clamp forces the ring 23 against the side of the chuck-stock and creates sufficient friction to prevent the rotation of the ring with the body of the chuck. The arm 29 is adjustably secured on shaft 14 by set-key 30, which enters the key-slot 14' after the manner of the keys in the pinions 16. The weight of the handle 15 on the shaft 14 is sufficient to normally elevate the arms 29 thereon. 29'' is a stop on arm 29 to engage a stop-pin 31 on the chuck-stock to hold the arm 29 in a position of readiness to be depressed by the raising of handle 15. This is done whenever it is desired to open or close the chuck-jaws and while the shaft 13 is being rotated. It is obvious that when the handle 15 is slightly turned the rings 23 of both chucks will be clasped against the stocks more or less firmly, according to the pressure of handle 15. Now if the shaft 13 is turned backwardly the chuck-bodies will be rotated and the jaws of both chucks will be opened by the action of the spiral threads thereon against the stationary spiral threads of the ring. The chucks will then be in condition to receive a piece of work. As soon as the work has been placed in the loose chucks the crank 7 will be rotated in a positive direction, and the rings 23 remaining stationary the jaws will be closed by the rotation of the shaft. When the jaws seat upon the work and are thereby held against further inward movement, they will themselves clamp the spiral ring and tend to cause said ring to rotate with the chuck-body against the friction of the clamps. One of the chuck-rings may take up its rotation in this manner before the other one does, and if a tapered stick is placed in the chucks this action will occur, the second chuck continuing to rotate with relation to its ring until its jaws are firmly seated upon the smaller end of the stick. The reverse of this operation takes place when the chucks are reversely rotated to open the jaws, all jaws being positively returned to their extreme outer positions.

It will be seen that I thus provide a chuck mechanism for spindle-turning machines in which the chucks are automatically operated simultaneously and are permitted either regular or irregular movement, according to the shape of the piece of work that is operated on.

In working the machine the operator grasps the handle 15 in one hand and the crank 7 in the other, turning the latter at the same time. As soon as the jaws grip the work and the spiral rings begin to rotate with the chucks the operator releases the retarding-device handle 15 and grasping the crank or lever 4 forces the carriage toward the rotating cutters. Meantime he will continue the operation of the crank 7 to rotatively feed the work to the cutters. The carriage returns automatically when the crank 4 is released, and immediately on loosing or dropping the crank 4 the operator again grasps the handle 15 to clamp the chuck-rings and by rotating the crank 7 backwardly causes the retraction of the chuck-jaws almost instantly after the work is retired from the cutters.

Figure 10:
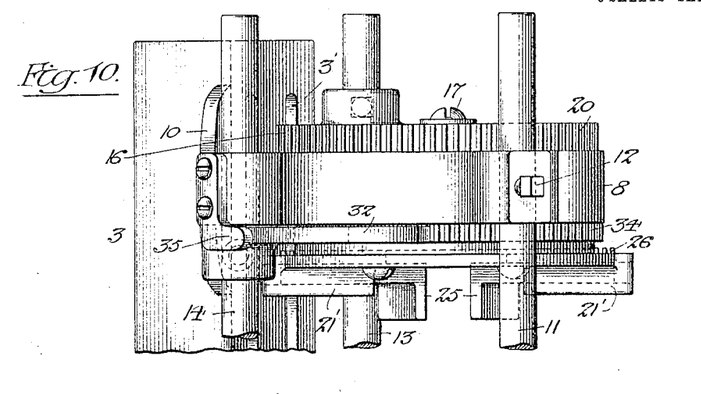
Figs. 10 and 11 are plan and end views similar to Figs. 3 and 4 and showing a modified form of the retarding device.
Figure 11:
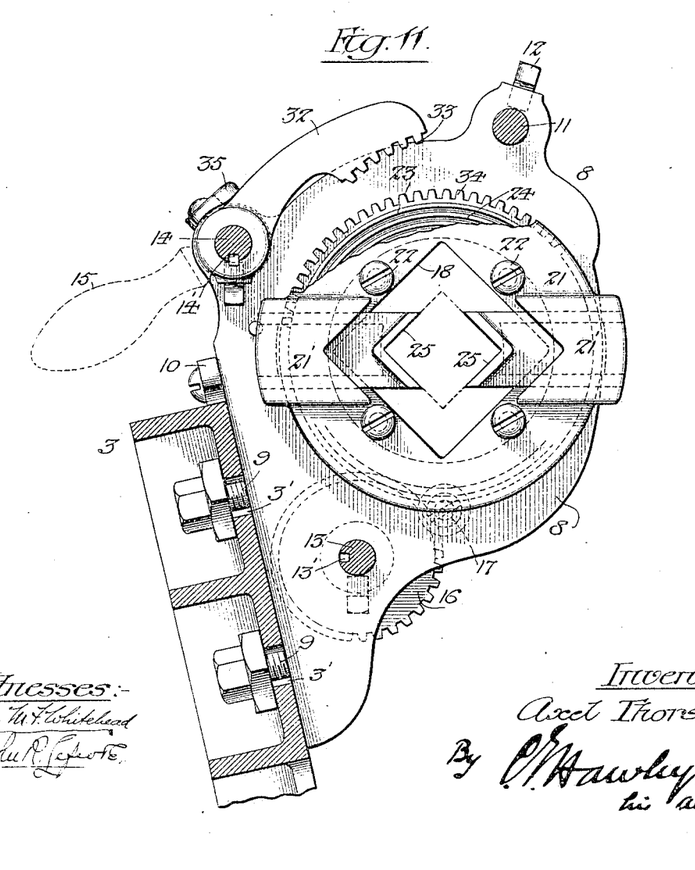
Figure 12:
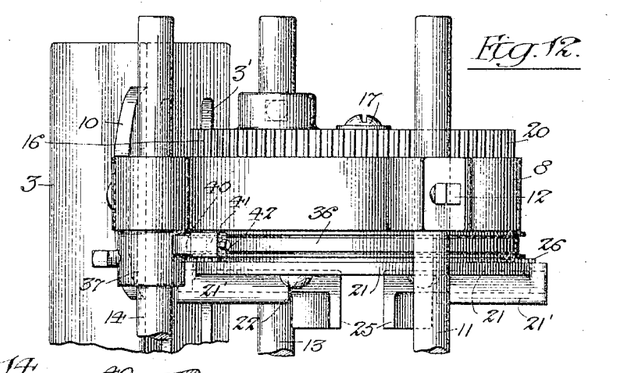
Fig. 12 is a plan view illustrating still another modification of the retarding device.
Figures 13, 14:
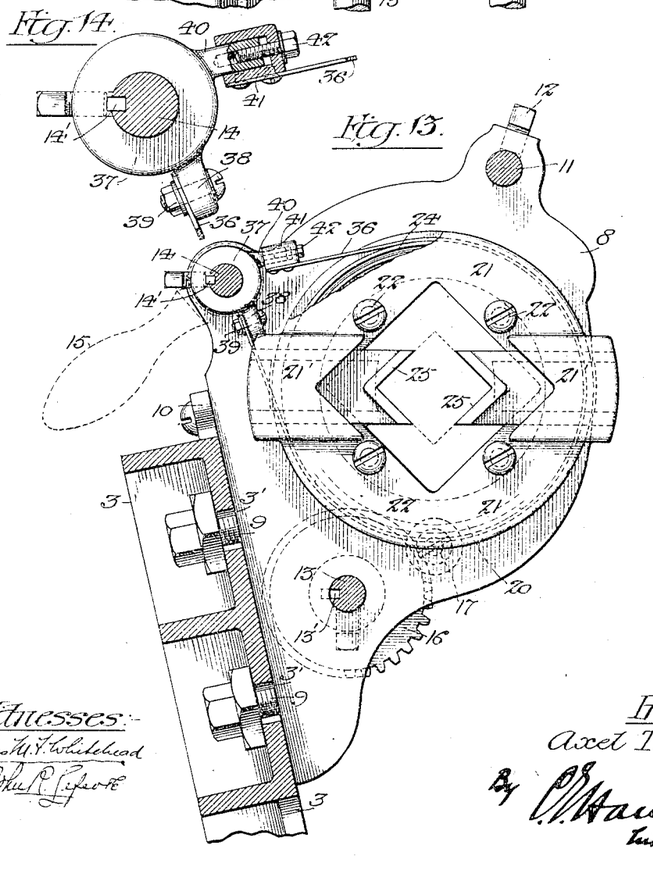

Figs. 10 and 11 illustrate a modification of my invention wherein the frictional retarding device belonging to the chuck is replaced by a more positive retarding or locking device for the spiral ring 23. As here shown, I may provide said ring 23 with gear-teeth 24 and equip the arm 32 with teeth 33 to engage the ring 23. Each chuck is thus equipped, and it is obvious that by slightly rotating the shaft 14 the arms 32 may be caused to engage the chuck-rings and hold the same as long as necessary. When the jaws lock upon or pick up the spiral ring, the resistance to the rotation of the chuck will be felt upon the handle 15 and crank 7, and the operator will release 15, thereafter continuing the rotation of the chucks to turn the work before the rotating cutters. 35 is a stop for the arm 32 and shaft 14. The fact that various devices may be employed for temporarily holding the chuck-rings against rotation in either direction is further exemplified in Figs. 12, 13, and 14. In this case a friction-band 36 takes the place of the ring-holding devices above described, same being arranged to tighten upon or around the chuck-ring 24 when the shaft 14 is turned in either direction. The ends of the band 36 are attached to the sleeve 37 of said shaft, the attachment being to lug 38 by bolt 39 at one end of the band and to lug 40 by the adjustable block 41 at the other end of the band. The end of the band is attached to the block 41, and the block is made slidably adjustable on lug 40 by means of the screw 42. This device enables me to take up the wear between the head and chuck-ring, as well as to initially adjust the band upon said ring. It is obvious that when the sleeve 37 is turned by means of handle 15 the band will be tightened upon the ring and hold the latter until the chuck-jaws have been moved, after which the ring will turn within the band. The band when properly adjusted will operate automatically, thereby dispensing with a momentary hand operation. I prefer, however, to positively apply and release the ring-retarding device in all cases, it being objectionable to continuously oppose any considerable friction or resistance to the easy rotation of the chucks by means of the crank 7.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a machine of the class described, a carriage, in combination with chucks revolubly mounted thereon and having radially-movable jaws, jaw-operating rings on said chucks, a spiral thread upon each of said rings, engaged with the respective jaws, and means movably arranged upon said carriage for frictionally opposing and controlling the rotation of said rings simultaneously, substantially as described.

2. In a machine of the class described, a carriage in combination with chucks revolubly mounted thereon and having radially-movable jaws, a spirally-threaded part for each chuck to operate the jaws thereof, said spirally-threaded parts being normally revoluble with respective chucks, individual frictional retarding devices for retarding the rotation of respective threaded parts during the rotation of said chucks in either direction, and means upon said carriage for simultaneously operating said frictional retarding devices, substantially as described.

3. In a machine of the class described, a carriage, in combination with chuck-bodies revolubly mounted thereon and having radially-movable jaws, a jaw-operating member mounted upon each said body, individual frictional means upon said carriage for retarding the rotation of said members and other means upon said carriage for simultaneously operating such individual frictional means, substantially as described.

4. In a machine of the class described, a carriage, in combination with chuck-bodies revolubly mounted thereon and having open centers, means for simultaneously operating said bodies, jaws radially mounted in said bodies, jaw-operating rings or members journaled upon said bodies and suitably connected to said jaws, friction devices provided on said carriage to engage respective rings, and means upon the carriage for simultaneously applying said devices to said rings, to retard the rotation thereof and operate said jaws during the operation of said bodies in either direction, substantially as described.

5. In a machine of the class described, a carriage in combination with chuck-bodies revolubly mounted thereon, means for rotating said chuck-bodies simultaneously, radially-movable jaws upon said bodies, jaw-operating rings journaled on said bodies respectively, and means upon said carriage for retarding the rotation of said rings during the rotation of said bodies and thereby causing said rings to simultaneously operate said jaws when said bodies are rotated, substantially as described.

6. In a machine of the class described, a carriage, in combination with chucks revolubly mounted thereon and having movable jaws, a jaw-operating ring mounted on each said chuck, ring-engaging clamps for frictionally resisting the rotation of said rings, and means upon the carriage for simultaneously operating said clamps, substantially as described.

7. In a turning-machine of the class described, a base and a cutter, in combination with a carriage mounted for movement toward and from said cutter, chuck-stocks provided upon said carriage, chuck-bodies revoluble in said stock, means upon the carriage for simultaneously rotating said bodies in either direction, work-holding jaws for each chuck-body, a jaw-operating device revolubly arranged on each chuck-body and normally revoluble therewith, means upon each chuck-stock for frictionally engaging the respective jaw-operating device, and means for simultaneously operating said frictional means, substantially as described.

8. In a turning-machine of the class described, a base and a cutter, in combination with a carriage mounted for movement to and from said cutter, chuck-bodies revolubly mounted upon said carriage, a set of radially-movable jaws for each said body, means for rotating said bodies simultaneously, a jaw-operating ring provided upon each chuck-body and revoluble therewith, and means for frictionally engaging and simultaneously retarding the rotation of said rings during the rotation of said chuck-bodies, whereby the chuck-jaws are moved in or out, according to the direction of rotation of said bodies, substantially as described.

9. In a turning-machine of the class described, a base and a cutter, in combination with a carriage mounted for movement toward and from said cutter, chuck-stocks mounted at the ends of said carriage and provided with chuck-body bearings, chuck-bodies having central openings and revoluble in said bearings, means movable with the carriage for simultaneously rotating said chuck-bodies, radial guides upon said chuck-bodies, jaws movable therein, jaw-operating rings mounted upon said bodies and engaged with said jaws, manually-operable devices mounted upon and movable with said carriage and adapted to be simultaneously moved into engagement with said jaw-operating rings, said devices when thus engaged with said rings being adapted to impede the rotation thereof in either direction at will, whereby both ends of a piece of work may be simultaneously chucked or released, substantially as described.

10. In a turning-machine, a base and a cutter, in combination with a carriage mounted for movement toward and from said cutter, chuck-stocks adjustably mounted upon said carriage and each provided with a chuck-body bearing, chuck-bodies revoluble in said bearings, a crank-actuated shaft mounted in said stocks and geared to said bodies for the simultaneous rotation thereof in either direction, radial guides provided upon said chuck-bodies, jaws movable therein, jaw-operating rings provided upon said bodies respectively and spirally engaged with the jaws thereof, a shaft mounted in said stocks and means operable by said shaft and adapted to engage and retard the rotation of said rings, during the rotation of said bodies and whereby said jaws are moved in or out according to the direction of rotation of said chuck-bodies, substantially as described.

11. In a turning-machine of the class described, a carriage, in combination with chuck-stocks mounted thereon and having bearings for chuck-bodies, chuck-bodies, having open centers and mounted in said bearings, means for simultaneously rotating said chuck-bodies in either direction, spirally-threaded rings mounted upon said chuck-bodies, jaws also mounted on said chuck-bodies and engaged with said rings respectively, devices for frictionally opposing the rotation of said rings and means for simultaneously operating said devices, substantially as and for the purpose specified.

In testimony whereof I have hereunto set my hand, this 17th day of May, A. D. 1904, at Beloit, Wisconsin, in the presence of two witnesses.

AXEL THORSBY.

Witnesses:
   JOHN C. ROOD,
   JOSHUA FOSTER.